United States Patent
Rai et al.

(10) Patent No.: US 8,554,212 B1
(45) Date of Patent: Oct. 8, 2013

(54) METHOD AND SYSTEM FOR SELECTING NEIGHBORING SECTOR SCANNING FREQUENCIES

(75) Inventors: Deveshkumar N. Rai, Overland Park, KS (US); Sachin R. Vargantwar, Overland Park, KS (US); Manoj Shetty, Overland Park, KS (US); Bhagwan Khanka, Lenexa, KS (US)

(73) Assignee: Sprint Spectrum L.P., Overland Park, KS (US)

(*) Notice: Subject to any disclaimer, the term of this patent is extended or adjusted under 35 U.S.C. 154(b) by 285 days.

(21) Appl. No.: 12/706,244

(22) Filed: Feb. 16, 2010

(51) Int. Cl.
*H04W 4/00* (2009.01)
*H04B 1/18* (2006.01)

(52) U.S. Cl.
USPC ..... 455/434; 455/436; 455/161.1; 455/161.2; 455/161.3; 455/435.3

(58) Field of Classification Search
USPC ............. 455/434, 154.1, 154.2, 161.1, 161.3, 455/164.1, 435.3, 512, 166.2, 513; 370/395.42, 370/444, 455, 436
See application file for complete search history.

(56) References Cited

U.S. PATENT DOCUMENTS

| | | | |
|---|---|---|---|
| 5,920,549 A | 7/1999 | Bruckert et al. | |
| 5,953,665 A * | 9/1999 | Mattila | 455/434 |
| 6,477,162 B1 * | 11/2002 | Bayley et al. | 370/342 |
| 6,771,968 B1 * | 8/2004 | Heubel | 455/454 |
| 6,917,809 B2 | 7/2005 | Horwath et al. | |
| 7,054,644 B2 * | 5/2006 | Heubel | 455/454 |
| 7,215,956 B2 | 5/2007 | Liu et al. | |
| 7,286,801 B2 | 10/2007 | Amerga et al. | |
| 7,423,994 B2 | 9/2008 | Liu et al. | |
| 7,907,564 B2 * | 3/2011 | Laux et al. | 370/329 |
| 2006/0171357 A1 * | 8/2006 | King et al. | 370/331 |
| 2007/0021119 A1 * | 1/2007 | Lee et al. | 455/436 |
| 2007/0275717 A1 * | 11/2007 | Edge et al. | 455/434 |
| 2008/0045210 A1 * | 2/2008 | Kaaja et al. | 455/434 |
| 2009/0003279 A1 | 1/2009 | Abusch-Magder et al. | |
| 2009/0047958 A1 | 2/2009 | Rimhagen et al. | |
| 2009/0047961 A1 * | 2/2009 | Kim | 455/436 |
| 2009/0068970 A1 * | 3/2009 | Ahmed et al. | 455/161.1 |
| 2009/0181676 A1 * | 7/2009 | Lee et al. | 455/436 |
| 2009/0185524 A1 * | 7/2009 | Sammour et al. | 370/328 |
| 2010/0157864 A1 * | 6/2010 | Salomone et al. | 370/311 |
| 2010/0216469 A1 * | 8/2010 | Yi et al. | 455/435.3 |
| 2010/0222055 A1 * | 9/2010 | Cho et al. | 455/434 |

* cited by examiner

*Primary Examiner* — Kent Chang
*Assistant Examiner* — William Lu

(57) ABSTRACT

A mobile station that is being served by a current sector receives a neighbor list that identifies a plurality of neighboring sectors and a respective priority for each neighboring sector. For each neighboring sector, the mobile station scans for the sector's pilot signal at a respective scanning frequency during a measurement interval. The scanning frequency for a sector defines how frequently the mobile station scans for the sector's pilot signal during the measurement interval. The mobile station selects a scanning frequency for a neighboring sector based on at least a signal strength of the current sector and the neighboring sector's priority. When the current sector's signal strength is high, the mobile station scans for high-priority sectors more frequently than low-priority sectors. When the current sector's signal strength is low, the mobile station scans for low-priority sectors more frequently than high-priority sectors.

18 Claims, 3 Drawing Sheets

METHOD AND SYSTEM FOR SELECTING NEIGHBORING SECTOR SCANNING FREQUENCIES

BACKGROUND

A wireless telecommunications network, such as a cellular wireless network, may be divided into a number of different wireless coverage areas, such as sectors. Each sector may be associated with a geographic area in which the signal strength from that sector is greater than that of other sectors. Thus, a mobile station located in a sector's geographic area may be served by the wireless network through that sector.

The sector serving the mobile station may also provide the mobile station with a neighbor list that identifies neighboring sectors. The mobile station may monitor these neighboring sectors, such as by periodically measuring the signal strength of each neighboring sector's respective pilot signal. The measured signal strength of a neighboring sector's pilot signal may be used to determine whether the neighboring sector is a candidate for a handoff.

In a conventional approach, a neighboring sector is considered a handoff candidate when its pilot signal strength exceeds a predefined threshold value. When the mobile station identifies a neighboring sector as a handoff candidate, the mobile station reports the sector's pilot signal strength to the wireless network, e.g., in a Pilot Strength Measurement Message (PSMM). The wireless network may then approve a handoff to the neighboring sector. The handoff to the neighboring sector could be either a hard handoff or a soft handoff.

OVERVIEW

In a first principal aspect, an exemplary embodiment provides a method for a mobile station that is being served by a current sector in a wireless network. The mobile station measures a signal from the current sector to obtain at least one signal strength measurement. The mobile station determines a current-sector signal strength based on the at least one signal strength measurement. The mobile station accesses a neighbor list that identifies a plurality of sectors neighboring the current sector, the plurality of sectors including at least a first sector and a second sector. The mobile station selects a first scanning frequency for the first sector and a second scanning frequency for the second sector based on at least the current-sector signal strength, such that the first scanning frequency is higher than the second scanning frequency when the current-sector signal strength is at a high level and the second scanning frequency is higher than the first scanning frequency when the current-sector signal strength is at a low level. The first and second scanning frequencies define how frequently the mobile station scans for signals from the first and second sectors, respectively, during a measurement interval.

In a second principal aspect, an exemplary embodiment provides a method for a mobile station. The mobile station receives a prioritized neighbor list from a current sector in a wireless network. The prioritized neighbor list identifies a plurality of neighboring sectors in the wireless network and a respective priority for each neighboring sector. The mobile station determines a current-sector signal strength of the current sector. The mobile station selects for each neighboring sector in the prioritized neighbor list a respective scanning frequency based on at least the current-sector signal strength and the neighboring sector's respective priority. The mobile station scans for signals from the neighboring sectors at the selected scanning frequencies.

In a third principal aspect, an exemplary embodiment provides a mobile station comprising a transceiver for wirelessly communicating with a wireless network, data storage for storing a neighbor list and a current-sector signal strength of a current sector in the wireless network, and a controller for controlling the transceiver. The neighbor list identifies a plurality of sectors neighboring the current sector in the wireless network, the plurality of sectors including at least a first sector and a second sector. The controller is configured to select a first scanning frequency and a second scanning frequency based on at least the current-sector signal strength, such that the first scanning frequency is higher than the second scanning frequency when the current-sector signal strength is at a high level and the second scanning frequency is higher than the first scanning frequency when the current-sector signal strength is at a low level. The controller is also configured to cause the transceiver to scan for signals from the first and second sectors at the first and second scanning frequencies, respectively.

DETAILED DESCRIPTION OF EXEMPLARY EMBODIMENTS

1. Introduction

Figure 1:
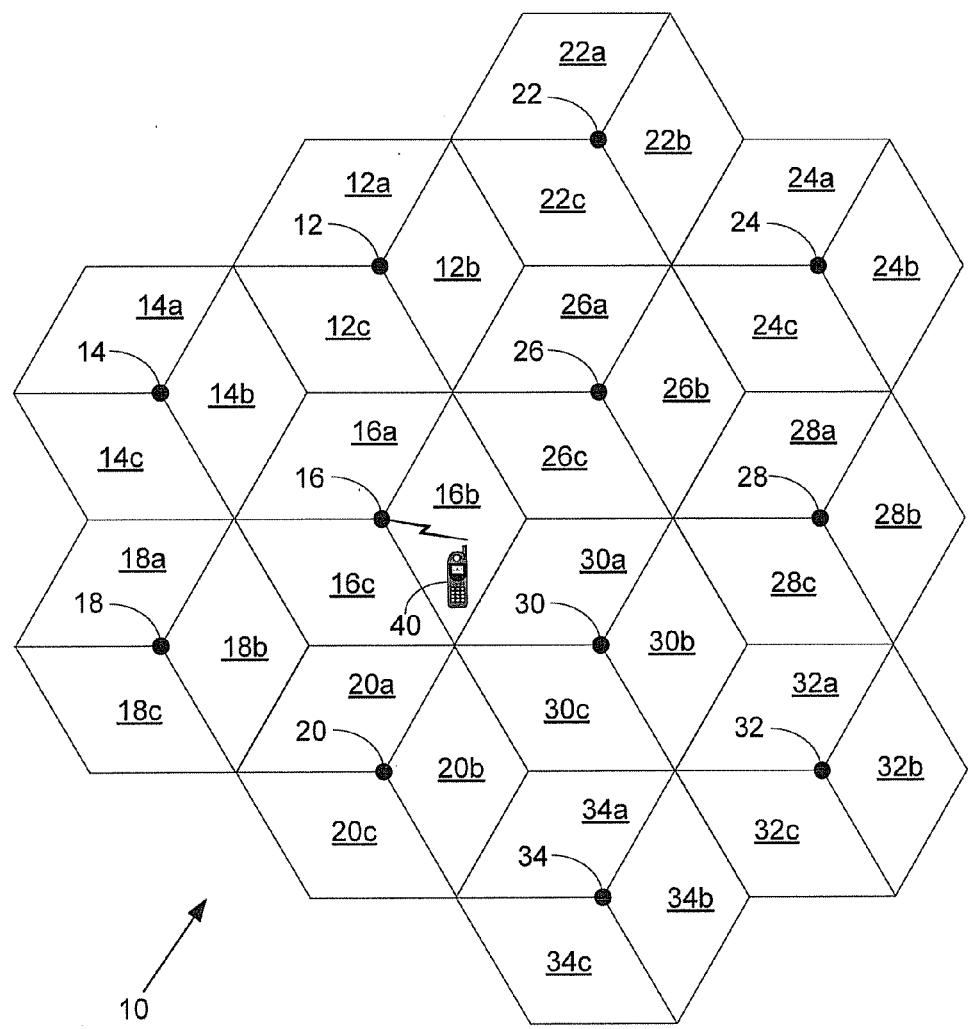
FIG. 1 is a schematic diagram illustrating an arrangement of sectors in a wireless telecommunications network, in accordance with an exemplary embodiment.

The inventors have recognized that the conventional approach of having a mobile station monitor neighboring sectors identified in a neighbor list can lead to inefficiencies because certain neighboring sectors are more likely to be candidates for a handoff than other neighboring sectors. As a result, it may be beneficial for the mobile station to scan more frequently for signals from neighboring sectors that are more likely to be handoff candidates. In addition, the inventors have recognized that the signal strength of the sector currently serving the mobile station may be used to determine which neighboring sectors are more likely to be handoff candidates.

For example, if the signal strength of the current sector is relatively high, indicating that the mobile station is relatively close to the current sector's transmitter, then neighboring sectors that are relatively close to the current sector's transmitter may be more likely to be handoff candidates than neighboring sectors that are more distant. In that case, it may be beneficial for the mobile station to scan the closer neighboring sectors more frequently than the more distant neighboring sectors. On the other hand, if the signal strength of the current sector is relatively low, indicating that the mobile station is relatively far from the current sector's transmitter, then neighboring sectors that are relatively far from the current sector's transmitter may be more likely to be handoff candidates than neighboring sectors that are relatively close. In that case, it may be beneficial for the mobile station to scan the more distant neighboring sectors more frequently than the closer neighboring sectors.

Various methods may be used to determine which neighboring sectors are relatively close and which neighboring sectors are relatively distant from the current sector's transmitter. In one approach, a mobile station may determine whether a neighboring sector is relatively close or relatively distant based on that neighboring sector's respective priority. For example, a mobile station being served by a current sector may receive a prioritized neighbor list from the current sector. The prioritized neighbor list may identify a plurality of neighboring sectors and a respective priority for each neighboring sector. The prioritized neighbor list might rank the neighboring sectors in a priority order, such that each neighboring sector has a distinct priority. Alternatively, the prioritized neighbor list might associate different groups of neighboring sectors with different priorities, such that multiple neighbor sectors have the same priority.

In either case, the priorities may be assigned by the network, for example, based on handoff statistics. Thus, neighboring sectors that are most often involved in successful handoffs from the current sector may be assigned the highest priority, whereas neighboring sectors that are less often involved in successful handoffs from the current sector may be assigned lower priorities. In this way, a neighboring sector's priority may provide an indication of the neighboring sector's distance from the current sector's transmitter.

Accordingly, a mobile station may use the current sector's signal strength in combination with a neighbor sector's priority to determine how frequently to scan for signals from that neighboring sector during a measurement interval. If the current sector's signal strength is high, the mobile station may select higher scanning frequencies for high-priority neighboring sectors and lower scanning frequencies for low-priority neighboring sectors. That way, the mobile station will scan more frequently for signals from sectors that are more likely handoff candidates, i.e., the high-priority neighboring sectors. On the other hand, if the current sector's signal strength is low, then the high-priority neighboring sectors are less likely to be handoff candidates than the low-priority neighboring sectors. Thus, if the current sector's signal strength is low, the mobile station may select higher scanning frequencies for low-priority neighboring sectors and lower scanning frequencies for high-priority neighboring sectors.

In an exemplary approach for selecting a scanning frequency for a neighboring sector, a mobile station selects the scanning frequency based on the signal strength of the sector currently serving the mobile station and the neighboring sector's priority. It is to be understood, however, that additional and/or alternative information may be used to select scanning frequencies. As one example, instead of using priority as an indication of distance, a mobile station may refer to the actual locations of the transmitters for the current sector and neighboring sectors. A mobile station may find this information, for example, in a base station almanac that the mobile station receives from the network. As another example, the time of day may also affect which neighboring sectors are more likely to be good handoff candidates, e.g., because traffic patterns may cause certain sectors to be highly congested during certain times of the day. Other information may also be used to select scanning frequencies.

By scanning more frequently for signals from neighboring sectors that are more likely to be handoff candidates, a mobile station may beneficially use its battery power more efficiently. In addition, the mobile station may be able to find more quickly a neighboring sector that is a candidate for a handoff, thereby reducing the chances that a call may be dropped.

2. Exemplary Wireless Telecommunications Network

FIG. 1 illustrates, in schematic form, an arrangement of sectors in an exemplary wireless telecommunications network 10. In this example, each of the sectors is defined by respective directional antennas on a respective base transceiver station (BTS). Thus, FIG. 1 shows BTSs 12-34 and, for each BTS, a corresponding set of three sectors indicated by the "a", "b", and "c" reference letters following the reference number of the corresponding BTS.

It is to be understood that the arrangement of sectors illustrated in FIG. 1 is exemplary only. Each BTS may define a greater or fewer number of sectors. In addition, as a schematic diagram, FIG. 1 is intended to illustrate the relative locations of exemplary sectors, rather than the actual sizes and shapes of sectors. As used herein, the term "sector" means any type of wireless coverage area, whether provided by directional antennas, omni-directional antennas, antenna arrays, or in other ways. Thus, the term "sector" includes cells (e.g., macrocells, microcells, picocells, and femtocells) as well as portions of cells that may be defined by directional antennas.

Each sector may support communications between its respective BTS and one or more mobile stations. For example, FIG. 1 shows a mobile station 40 being served by sector 16b of BTS 16. Mobile station 40 could be, for example, a wireless telephone, wireless personal digital assistant (PDA), wirelessly equipped laptop computer, or other wireless communication device. The communications between mobile station 40 and sector 20b may use a protocol such as 1xRTT CDMA, EVDO, GSM, UMTS, IEEE 802.11 (WiFi), IEEE 802.16 (WiMAX), or other wireless communication protocol.

While being served by sector 16b, mobile station 40 may monitor a paging channel and/or other downlink channels associated with sector 16b in order to receive communications from wireless network 10. Mobile station 40 may also periodically determine the radio frequency (RF) conditions in sector 16b, such as by measuring the signal strength of a pilot signal associated with sector 16b (e.g., a pilot signal transmitted by BTS 16 using the directional antennas that define sector 16b). Mobile station 40 may also use one or more uplink channels associated with sector 16b in order to transmit communications to wireless network 10.

Sector 16b may transmit a neighbor list to mobile station 40, e.g., over a paging channel. The neighbor list may identify a plurality of sectors neighboring sector 16b. The neighboring sectors identified in the neighbor list may include one or more sectors that are adjacent to sector 16b, such as sectors 16a, 16c, 26c, and 30a. The neighbor list may also identify as neighboring sectors one or more non-adjacent sectors, such as sectors 22c, 24c, 32a, and 34a.

The neighbor list transmitted by sector 16b could be a prioritized neighbor list that identifies a priority for each neighboring sector. For example, a prioritized neighbor list from sector 16b may identify neighboring sectors that are relatively close to sector 16b, such as sectors 16a, 16c, 26c, and 30a, as being high-priority sectors and may identify neighboring sectors that are relatively far from sector 16b, such as sectors 22c, 24c, 32a, and 34a, as being low-priority sectors. The prioritized neighbor list may also identify neighboring sectors that are at intermediate distances from sector 16b as being intermediate-priority sectors.

A prioritized neighbor list may identify priorities of neighboring sectors in various ways. For example, a prioritized neighbor list may associate each neighboring sector with a distinct number that indicates its priority. Thus, in a prioritized neighbor list of twenty neighboring sectors, the highest-priority sector may be identified as priority "1," the next-highest priority sector may be identified as priority "2," etc., with the lowest-priority sector in the list being identified as priority "20." Alternatively, multiple sectors could have the same priority. Thus, a prioritized neighbor list of twenty neighboring sectors may include a group of priority "1" sectors, a group of priority "2" sectors, a group of priority "3" sectors, and a group of priority "4" sectors. It is to be understood that these priority identifications are exemplary only, as a prioritized neighbor list may include a greater or fewer number of neighboring sectors, may include a greater or fewer number of priority levels, and may identify priorities numerically, textually, or in other ways.

After receiving a neighbor list from sector 16b, mobile station 40 may scan for signals (e.g., pilot signals) from the neighboring sectors identified in the neighbor list during one or more measurement intervals. More particularly, mobile station 40 may select for each neighboring sector a scanning frequency that defines how frequently it scans for signals from the neighboring sector during the measurement interval. If mobile station 40 finds a neighboring sector with a signal strength that exceeds a predefined threshold, then that neighboring sector may be identified as a candidate for a handoff. For example, while being served by sector 16b, mobile station 40 may identify sector 26c as a handoff candidate based on its signal strength. Mobile station 40 may then report the signal strength of sector 26c to wireless network 10 and request a handoff. Wireless network 10 may approve the requested handoff to sector 26c and transmit (e.g., via sector 16b) a handoff direction message to mobile station 40.

The handoff to sector 26c could be a hard handoff, in which mobile station 40 breaks its connection with sector 16b before completing a new connection with sector 26c. Alternatively, the handoff to sector 26c could be a soft handoff, in which mobile station 40 maintains its connection with sector 16b even after the new connection with sector 26c is completed. For example, mobile station 40 may be able to communicate with multiple sectors at the same time. In that case, mobile station 40 may maintain an "active set" that identifies the one or more sectors with which mobile station is currently communicating. Thus, before a soft handoff from sector 16b to sector 26c, the active set of mobile station 40 may identify only sector 16b. After the soft handoff, the active set may identify both sector 16b and sector 26c. Thereafter, mobile station 40 may receive a neighbor list from sector 26c and may scan for signals from the sectors identified in that neighbor list instead of or in addition to the sectors identified in the neighbor list from sector 16b.

It is to be understood, however, that a handoff of mobile station 40 from sector 16b to sector 26c is exemplary only, as mobile station 40 could be handed off to any neighboring sector in the neighbor list or could even be handed off to a sector that is not identified in the neighbor list. It is also possible that mobile station 40 might not undergo any handoff at all during a measurement interval (e.g., because no handoff candidates were found or because the wireless network did not approve a requested handoff). In that case, mobile station 40 might scan for signals from the neighboring sectors during another measurement interval, using either the same scanning frequencies or different scanning frequencies as in the previous measurement interval.

3. Exemplary Method

Figure 2:
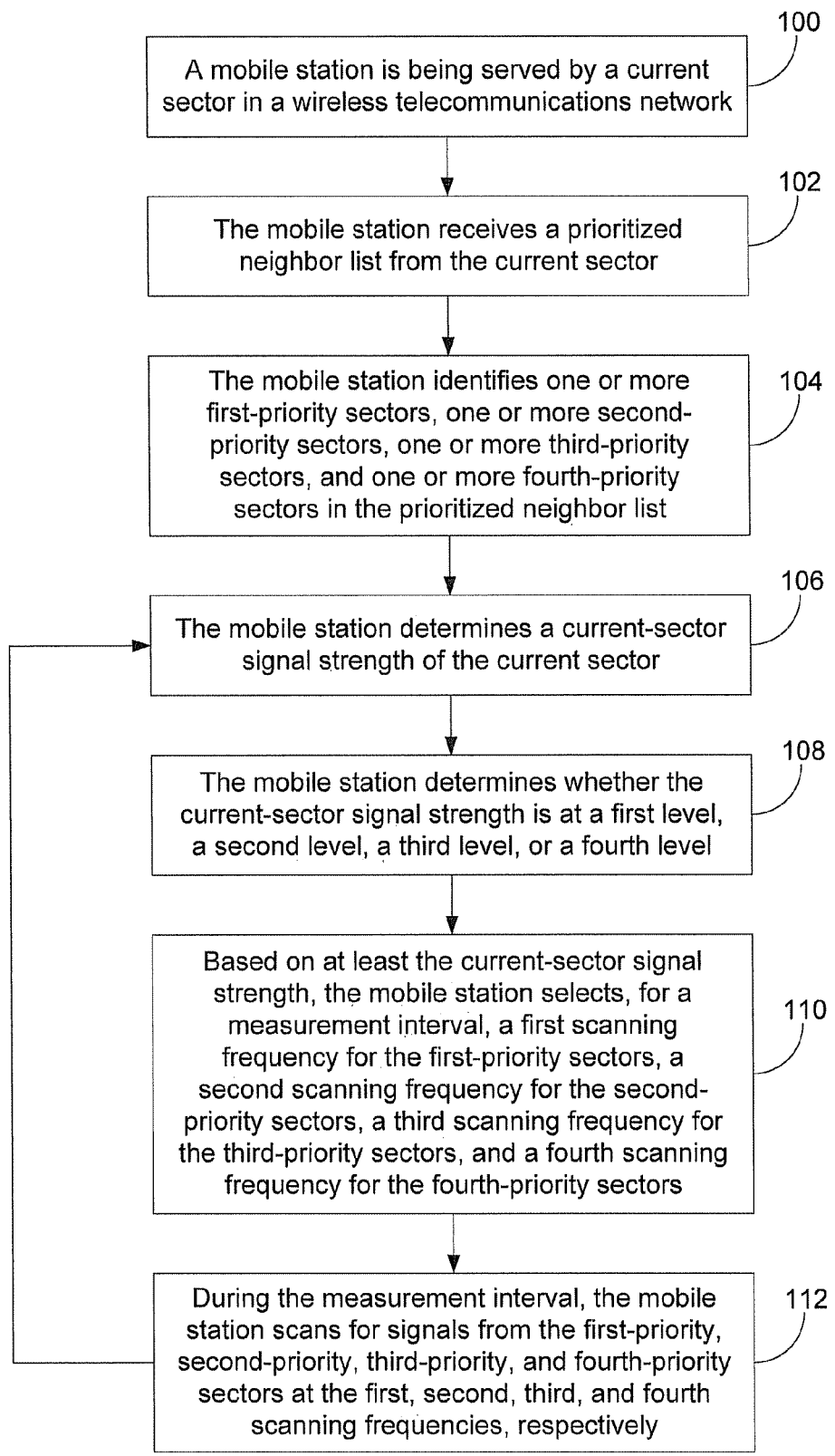
FIG. 2 is a flow chart illustrating a method of a selecting and using scanning frequencies, in accordance with an exemplary embodiment.

FIG. 2 is a flow chart illustrating an exemplary method of selecting and using scanning frequencies. For purposes of illustration, FIG. 2 is described with reference to the configuration of sectors shown in FIG. 1. It is to be understood, however, that other configurations could be used.

The method begins with a mobile station (e.g., mobile station 40) being served by a current sector in a wireless telecommunications network (e.g., sector 16b in wireless telecommunications network 10), as indicated by block 100. At this stage, the mobile station is monitoring a paging channel and/or other downlink channel of the current sector. The mobile station might also identify the current sector as being in an "active set."

While being served by the current sector, the mobile station receives a prioritized neighbor list from the current sector, as indicated by block 102. For example, the mobile station may receive the prioritized neighbor list over the current sector's paging channel. The prioritized neighbor list identifies a plurality of sectors neighboring the current sector and identifies a respective priority for each neighboring sector. For purposes of illustration, this example assumes that the prioritized neighbor list identifies twenty neighboring sectors, with priorities ranging from "1" (the highest priority sector) to "20" (the lowest priority sector). It is to be understood, however, that prioritized neighbor lists with different numbers of neighboring sectors and/or priorities could be used.

The mobile station then identifies one or more first-priority sectors, one or more second-priority sectors, one or more third-priority sectors, and one or more of fourth-priority sectors in the prioritized neighbor list, as indicated by block 104. Thus, in a prioritized neighbor list of twenty neighboring sectors, the mobile station may identify the neighboring sectors with priorities "1" through "5" as the first-priority sectors, the neighboring sectors with priorities "6" through "10" as the second-priority sectors, the neighboring sectors with priorities "11" through "15" as the third-priority sectors, and the neighboring sectors with priorities "16" through "20" as the fourth-priority sectors. It is to be understood, however, that these priority groupings are illustrative only. For example, instead of four priority groupings, the mobile station could identify a greater or fewer number. In addition, while each priority grouping in this example has the same number of sectors, different priority groupings might have different numbers of sectors.

As described above, a mobile station might assign neighboring sectors to priority groupings based solely on the neighboring sectors' identified priorities in a prioritized neighbor list. Alternatively, the mobile station might assign neighboring sectors to priority groupings based, in whole or in part, on other information. Such other information might include, for example, the locations of transmitters associated with the neighboring sectors, the time of day, or sector congestion information.

The mobile station also determines a current-sector signal strength of the current sector, as indicated by block 106. For example, the mobile station might measure the signal strength of the current sector's pilot signal to obtain at least one signal strength measurement and then determine the current-sector signal strength based on the at least one signal strength. Thus, the mobile station might take the most recent signal strength measurement as the current-sector signal strength, or the mobile station might average several signal strength measurements to obtain the current-sector signal strength.

The mobile station then determines whether the current-sector signal strength is at a first level, a second level, a third level, or a fourth level, as indicated by block 108. To make this determination, the mobile station may compare the current-sector signal strength to one or more signal strength thresholds, such as an upper threshold, an intermediate threshold, and a lower threshold. If the current-sector signal strength is greater than the upper threshold, the mobile station may determine that the current-sector signal strength is at the first level (a signal strength that might be described as "very good"). If the current-sector signal strength is less than the upper threshold and greater than the intermediate threshold, the mobile station may determine that the current-sector signal strength is at the second level (a signal strength that might be described as "good"). If the current-sector signal strength is less than the intermediate threshold and greater than the lower threshold, the mobile station may determine that the current-sector signal strength is at the third level (a signal strength that might be described as "average"). If the current-sector signal strength is less than the lower threshold, the mobile station may determine that the current-sector signal strength is at the fourth level (a signal strength that might be described as "poor"). It is to be understood, however, that the use of four levels to categorize the current-sector signal strength is exemplary only, as a greater or fewer number of levels may be used. In addition, the current-sector signal strength could be categorized in other ways.

Based on at least the current-sector signal strength, the mobile station selects, for a measurement interval, a first scanning frequency for the first-priority sectors, a second scanning frequency for the second-priority sectors, a third scanning frequency for the third-priority sectors, and a fourth scanning frequency for the fourth-priority sectors, as indicated by block 110. During the measurement interval, the mobile station scans for signals from the first-priority, second-priority, third-priority, and fourth-priority sectors at the first, second, third, and fourth scanning frequencies, respectively, as indicated by block 112.

Each priority grouping's scanning frequency defines how frequently the mobile station scans for signals (e.g., pilot signals) from sectors in that priority grouping during the measurement interval. To select the scanning frequencies, the mobile station may refer to a table, such as the following:

TABLE 1

| Neighboring Sector Priority Grouping | Current-Sector Signal Strength | | | |
|---|---|---|---|---|
| | Very Good | Good | Average | Poor |
| First-priority sectors (1-5) | 3 | 2 | 1 | 1 |
| Second-priority sectors (6-10) | 1 | 3 | 2 | 1 |
| Third-priority sectors (11-15) | 1 | 1 | 3 | 2 |
| Fourth-priority sectors (16-20) | 1 | 1 | 2 | 3 |

Based on Table 1, if the current-sector signal strength is very good (i.e., at the first level), the mobile station would select a scanning frequency of 3 for the first-priority sectors (e.g., the neighboring sectors with priorities 1 through 5) and a scanning frequency of 1 for the other sectors. In that case, the mobile station would scan for signals from each of the first-priority sectors three times during the measurement interval and would scan for signals from each of the other sectors once during the measurement interval. Thus, when the current-sector signal strength is at a high level (e.g., at the first level), the mobile station scans for signals from the highest-priority neighboring sectors (e.g., the first-priority sectors) more frequently than for other neighboring sectors.

On the other hand, based on Table 1, if the current-sector signal strength is poor (i.e., at the fourth level), the mobile station would select a scanning frequency of 3 for the fourth-priority sectors (e.g., the neighboring sectors with priorities 16 through 20), a scanning frequency of 2 for the third-priority sectors (e.g., the neighboring sectors with priorities 11 through 15), and a scanning frequency of 1 for the other sectors. In that case, the mobile station would scan for signals from each of the fourth-priority sectors three times during the measurement interval, would scan for signals from each of the third-priority sectors twice during the measurement interval, and would scan for signals from each of the other sectors once during the measurement interval. Thus, when the current-sector signal strength is at a low level (e.g., at the fourth level), the mobile station scans for signals from the lowest-priority neighboring sectors (e.g., the fourth-priority sectors) more frequently than for other neighboring sectors.

Similarly, based on Table 1, when the current-sector signal strength is at an intermediate level (e.g., at the second level or third level), the mobile station scans for signals from the intermediate-priority sectors (e.g., the second-priority or third-priority sectors) more frequently than for other sectors.

It is to be understood that the scanning frequencies shown in Table 1 are exemplary only. Thus, a mobile station might a select a scanning frequency that is greater than three, or a mobile station might select a scanning frequency of zero. For example, if the current-sector signal strength is very good, a mobile station might select a scanning frequency of zero for the fourth-priority sectors. In that case, the mobile station would not scan for signals from the fourth-priority sectors at all during the measurement interval.

One possible result of scanning for signals from neighboring sectors during the measurement interval, is that the mobile station finds a neighboring sector with a signal strength that is high enough to be designated a candidate for a handoff. If that occurs, the mobile station may report the neighboring sector to the wireless network, and the wireless network may instruct the mobile station to undergo a handoff to the neighboring sector.

If, however, the mobile station does not find a handoff candidate, then the mobile station may cycle through another measurement interval. Thus, after scanning for signals during one measurement interval, the mobile station may start another measurement interval by determining a new current-sector signal strength of the current sector, as indicated by the arrow from block 112 to block 106. To do this, the mobile station may make another signal strength measurement of the current-sector's pilot signal, in order to account for the possibility that the RF conditions may have changed since the previous measurement interval (e.g., because of the mobile station's movement). The mobile station may then determine what level the new current-sector signal strength is at (block 108), select new scanning frequencies based on the new current-sector signal strength (block 110), and again scan for signals from the neighboring sectors (block 112).

In this way, the mobile station may adjust the manner in which it searches for signals from neighboring sectors in response to changing RF conditions.

4. Exemplary Mobile Station

Figure 3:
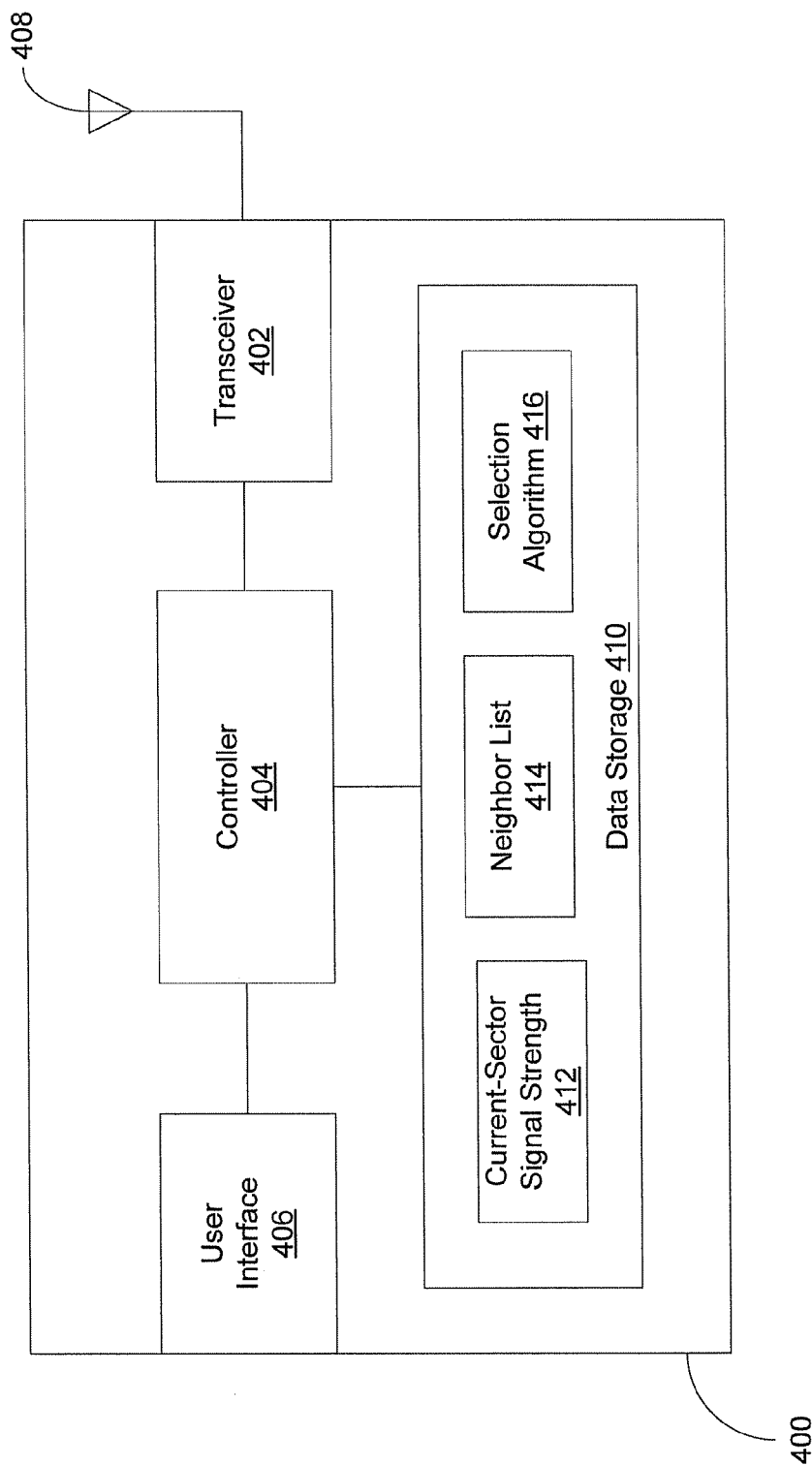
FIG. 3 is a block diagram of a mobile station, in accordance with an exemplary embodiment.

FIG. 3 is a block diagram of an exemplary mobile station 400. Mobile station 400 includes a transceiver 402, a controller 404, and a user interface 406. Transceiver 402 is configured to wirelessly communicate with a wireless network, via one or more antennas, such as antenna 408. Such communication may include transmitting and receiving voice, data, video and/or other media.

Controller 404 is configured to control the operation of mobile station 400, including the functioning of transceiver 402. In some cases, controller 404 may control mobile station 400 automatically. In other cases, controller 404 may control mobile station 400 in response to instructions from the wireless network received via transceiver 402 or in response to instructions from the user received via user interface 406.

User interface 406 is configured to receive input from the user and to convey output from the user. For example, user interface 406 may include a touch screen, a keypad, buttons, and or other controls for receiving input from the user. User interface 406 may also include a display screen for displaying textual and/or graphical information to the user. In addition, user interface 406 may include a microphone and speaker for voice communication.

Mobile station 400 also includes data storage 410 that stores information that may be accessed by controller 404. Data storage 410 may include volatile and/or non-volatile memory. Some of the information stored in data storage 410 may be stored during the provisioning of mobile station 400 for wireless service. Some of the information stored in data storage 410 may be received from the wireless network, via transceiver 402. Still other information stored in data storage 410 may be received via user interface 406 or in other ways.

To facilitate functions relating to selecting and using scanning frequencies, e.g., as described above for FIG. 2, data storage 410 may store a current-sector signal strength 412 and a neighbor list 414. Controller 404 may calculate the current-sector signal strength 412 based on one or more signal strength measurements of the current sector's pilot signal received by transceiver 402. The neighbor list 414 may be received by transceiver 402 from the current sector and may identify a plurality of sectors neighboring the current sector. Neighbor list 414 could be a prioritized neighbor list that identifies a respective priority for each neighboring sector.

Controller 404 may access the current-sector signal strength 412 and the neighbor list 414 in order to select scanning frequencies that define how frequently signals from each of the neighboring sectors are scanned during a measurement interval. In particular, controller 404 may be configured to select a first scanning frequency for at least a first neighboring sector in neighbor list 414 and a second scanning frequency for at least a second neighboring sector in neighbor list 414, based on at least the current-sector signal strength 412 and in accordance with a selection algorithm 416 (which may be stored in data storage 410).

According to selection algorithm 416, the dependence of the scanning frequency on the current-sector signal strength 412 may be different for different sectors. For example, if the first neighboring sector is a high-priority sector and the second neighboring sector is a low-priority sector then the algorithm may provide for the first scanning frequency to be higher than the second scanning frequency when the current-sector signal strength 412 is at a high level and may provide for the second scanning frequency to be higher than the first scanning frequency when the current-sector signal strength 412 is at a low level. Selection algorithm 416 may include a table for selecting scanning frequencies, for example, as described above for Table 1.

Once controller 404 selects scanning frequencies for the neighboring sectors in neighbor list 414, controller causes transceiver 402 to scan for signals from the neighboring sectors at the selected scanning frequencies. Thus, controller 404 may be configured to cause transceiver 402 to scan for signals from the first and second neighboring sectors at the first and second scanning frequencies, respectively.

Controller 404 may be implemented using hardware, software, and/or firmware. For example, control 404 may include a processor that executes program instructions stored in data storage 410.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a mobile station that is being served by a current sector in a wireless network, comprising:
   said mobile station measuring a signal from said current sector to obtain at least one signal strength measurement;
   said mobile station determining a current-sector signal strength based on said at least one signal strength measurement;
   said mobile station accessing a neighbor list that identifies a plurality of sectors neighboring said current sector, said plurality of sectors including at least a first sector and a second sector; and
   said mobile station selecting a first scanning frequency for said first sector and a second scanning frequency for said second sector based on at least said current-sector signal strength, said first and second scanning frequencies defining how frequently said mobile station scans for signals from said first and second sectors respectively during a measurement interval, wherein said mobile station selects said first and second scanning frequencies such that said first scanning frequency is higher than said second scanning frequency when said current-sector signal strength is at a high level and said second scanning frequency is higher than said first scanning frequency when said current-sector signal strength is at a low level.

2. The method of claim 1, wherein said current sector is identified in an active set maintained by said mobile station.

3. The method of claim 2, further comprising:
   said mobile station scanning for signals from said first and second sectors during said measurement interval to determine whether either sector is a candidate for inclusion in said active set.

4. The method of claim 1, wherein said neighbor list is a prioritized neighbor list that identifies said first sector as having a higher priority than said second sector.

5. The method of claim 4, further comprising:
   said mobile station receiving said prioritized neighbor list from said current sector.

6. The method of claim 4, further comprising:
   said mobile station identifying a plurality of high-priority sectors and a plurality of low-priority sectors in said neighbor list, said high-priority sectors including said first sector, said low-priority sectors including said second sector;
   said mobile station selecting said first scanning frequency for said high-priority sectors; and
   said mobile station selecting said second scanning frequency for said low-priority sectors.

7. The method of claim 6, further comprising:
   said mobile station determining that said current-sector signal strength is at said high level; and
   said mobile station selecting said first and second scanning frequencies such that said first scanning frequency is higher than said second scanning frequency.

8. The method of claim 7, wherein said mobile station determining that said current-sector signal strength is at said high level comprises:
   said mobile station determining that said current-sector signal strength is greater than a threshold.

9. The method of claim 6, further comprising:
   said mobile station determining that said current-sector signal strength is at said low level; and said mobile station selecting said first and second scanning frequencies such that said second scanning frequency is higher than said first scanning frequency.

10. The method of claim 9, wherein said mobile station determining that said current-sector signal strength is at said low level comprises:
said mobile station determining that said current-sector signal strength is less than a threshold.

11. The method of claim 6, further comprising:
said mobile station identifying a plurality of intermediate-priority sectors in said neighbor list; and
said mobile station selecting a third scanning frequency for said intermediate-priority sectors.

12. The method of claim 11, further comprising:
said mobile station determining that said current-sector signal strength is at an intermediate level; and
said mobile station selecting said first, second, and third scanning frequencies such that third scanning frequency is higher than said first and second scanning frequencies.

13. The method of claim 12, wherein said mobile station determining that said current-sector signal strength is at an intermediate level comprises:
said mobile station determining that said current-sector signal strength is less than an upper threshold and greater than a lower threshold.

14. A method for a mobile station, said method comprising:
said mobile station receiving a prioritized neighbor list from a current sector in a wireless network, said prioritized neighbor list identifying a plurality of neighboring sectors in said wireless network and a respective priority for each neighboring sector;
said mobile station identifying a plurality of first-priority sectors, a plurality of second-priority sectors, a plurality of third-priority sectors, and a plurality of fourth-priority sectors in said prioritized neighbor list;
said mobile station determining a current-sector signal strength of said current sector;
said mobile station selecting, based on at least said current-sector signal strength, a first scanning frequency for said first-priority sectors, a second scanning frequency for said second-priority sectors, a third scanning frequency for said third-priority sectors, and a fourth scanning frequency for said fourth-priority sectors, wherein said mobile station selecting, based on at least said current-sector signal strength, a first scanning frequency for said first-priority sectors, a second scanning frequency for said second-priority sectors, a third scanning frequency for said third-priority sectors, and a fourth scanning frequency for said fourth-priority sectors comprises said mobile station selecting said first, second, third, and fourth scanning frequencies such that said first scanning frequency is highest when said current-sector signal strength is at a first level, said second scanning frequency is highest when said current-sector signal strength is at a second level, said third scanning frequency is highest when said current-sector signal strength is at a third level, and said fourth scanning frequency is highest when said current-sector signal strength is at a fourth level; and
said mobile station scanning for signals from said first-priority, second-priority, third-priority, and fourth-priority sectors at said first, second, third, and fourth scanning frequencies, respectively.

15. The method of claim 14, further comprising:
said mobile station comparing said current-sector signal strength to at least one of an upper threshold, an intermediate threshold, and a lower threshold.

16. The method of claim 15, further comprising:
if said current-sector signal strength is greater than said upper threshold, said mobile station determining that said current-sector signal strength is at said first level;
if said current-sector signal strength is less than said upper threshold and greater than said intermediate threshold, said mobile station determining that said current-sector signal strength is at said second level;
if said current-sector signal strength is less than said intermediate threshold and greater than said lower threshold, said mobile station determining that said current-sector signal strength is at said third level; and
if said current-sector signal strength is less than said lower threshold, said mobile station determining that said current-sector signal strength is at said fourth level.

17. A mobile station, comprising:
a transceiver for wirelessly communicating with a wireless network;
data storage for storing a current-sector signal strength of a current sector in said wireless network and a neighbor list that identifies a plurality of sectors neighboring said current sector, said plurality of sectors including at least a first sector and a second sector; and
a controller for controlling said transceiver, wherein said controller is configured to select a first scanning frequency and a second scanning frequency based on at least said current-sector signal strength, such that said first scanning frequency is higher than said second scanning frequency when said current-sector signal strength is at a high level and said second scanning frequency is higher than said first scanning frequency when said current-sector signal strength is at a low level, and cause said transceiver to scan for signals from said first and second sectors at said first and second scanning frequencies, respectively.

18. The mobile station of claim 17, wherein said neighbor list is a prioritized neighbor list that identifies said first sector as having a higher priority than said second sector.

* * * * *